United States Patent [19]
Borsuk et al.

[11] 3,948,158
[45] Apr. 6, 1976

[54] MULTIPLE-STAGE GANG-TYPE PLUG PUSHING ASSEMBLY

[75] Inventors: Alvin Borsuk; Charles H. Johnson, both of Madison, Wis.

[73] Assignee: Oscar Mayer & Co. Inc., Madison, Wis.

[22] Filed: Mar. 11, 1975

[21] Appl. No.: 557,256

[52] U.S. Cl. ............... 99/355; 99/427; 99/443 C; 99/448; 426/513; 426/389
[51] Int. Cl.² .......................................... A47J 27/12
[58] Field of Search .......... 99/355, 416, 443 C, 427, 99/441, 448, 349, 351; 426/513, 516, 389, 523, 517, 512

[56] References Cited
UNITED STATES PATENTS

| | | | |
|---|---|---|---|
| 3,039,136 | 6/1962 | Toepper | 99/351 |
| 3,122,243 | 2/1964 | Hawley | 99/443 |
| 3,132,950 | 5/1964 | Macy | 99/427 X |
| 3,167,000 | 1/1965 | Sassen | 99/441 X |
| 3,638,554 | 2/1972 | Ackroyd | 99/351 |
| 3,796,144 | 3/1974 | Foldenauer | 99/355 |

*Primary Examiner*—Billy J. Wilhite
*Attorney, Agent, or Firm*—Lockwood, Dewey, Zickert & Alex

[57] ABSTRACT

Mechanism for applying a squeezing force to a food product in a mold, including a fluid motor driving a reciprocal rod for engaging and applying a force to a plug movably positionable within the mold. The reciprocal rod is driven by the fluid motor to move the plug into the mold until the resisting force of the food produce within the mold balances the force exerted by the fluid motor. The squeezing force is applied a plurality of times to obtain a uniform cross-sectionally dimensioned food product.

10 Claims, 6 Drawing Figures

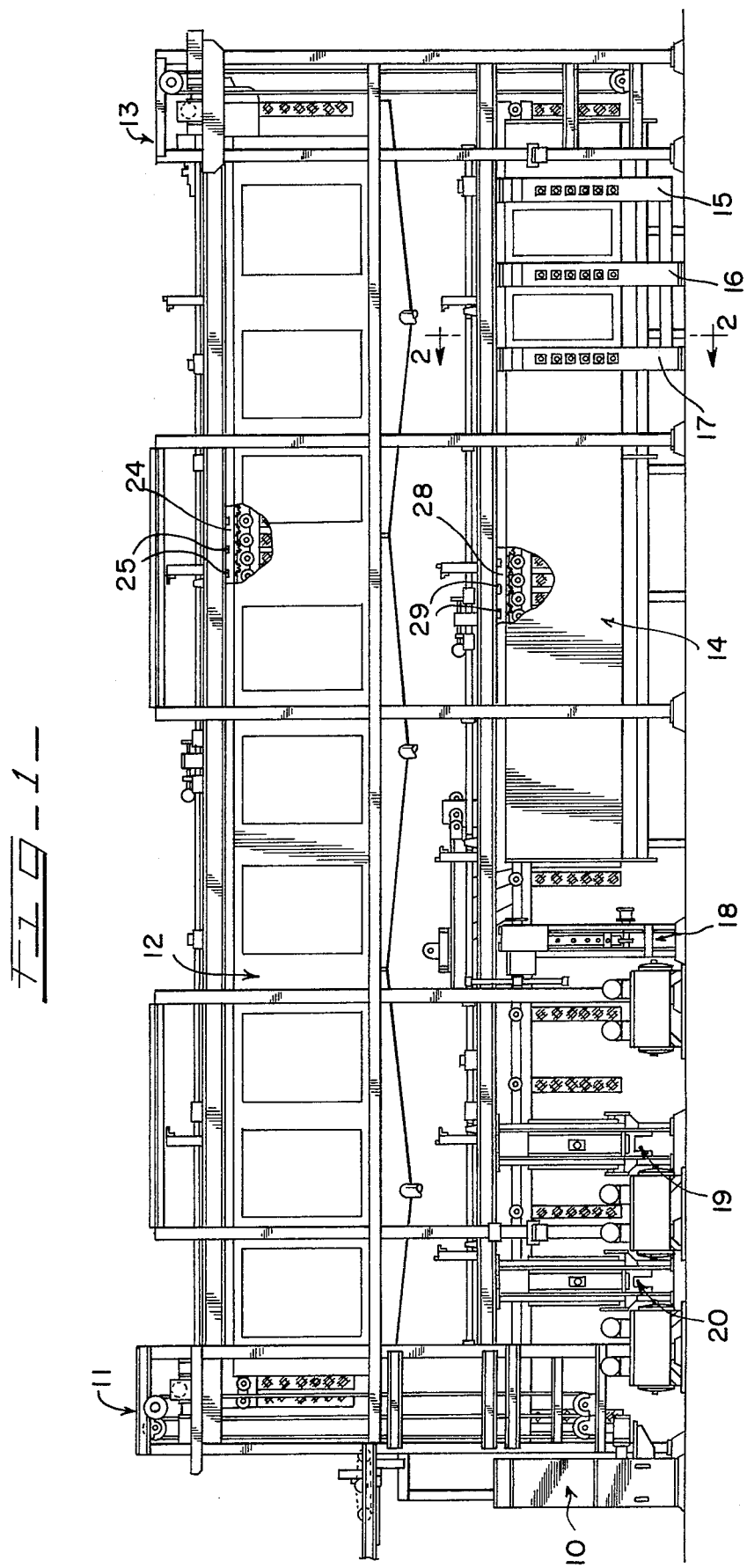

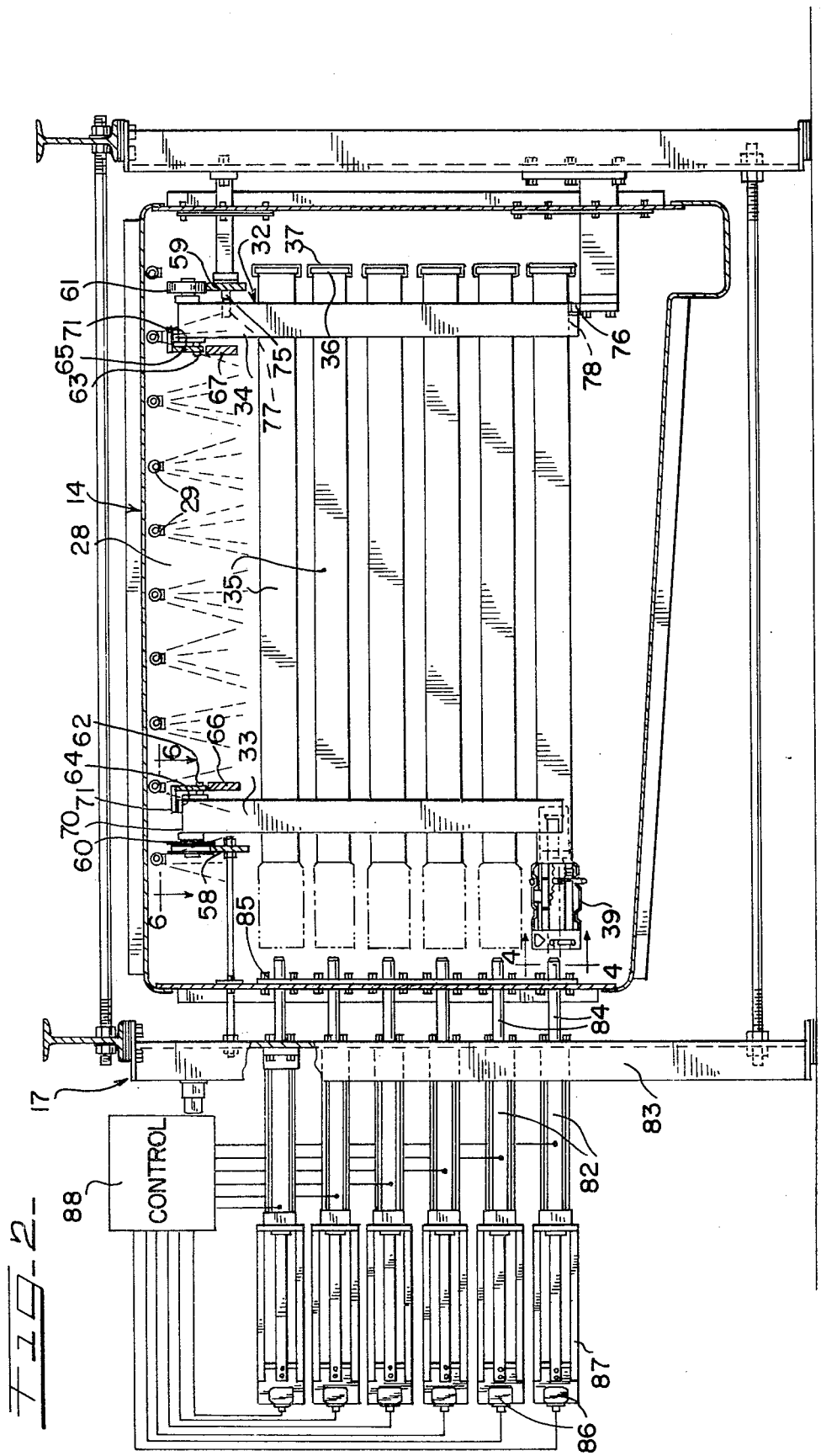

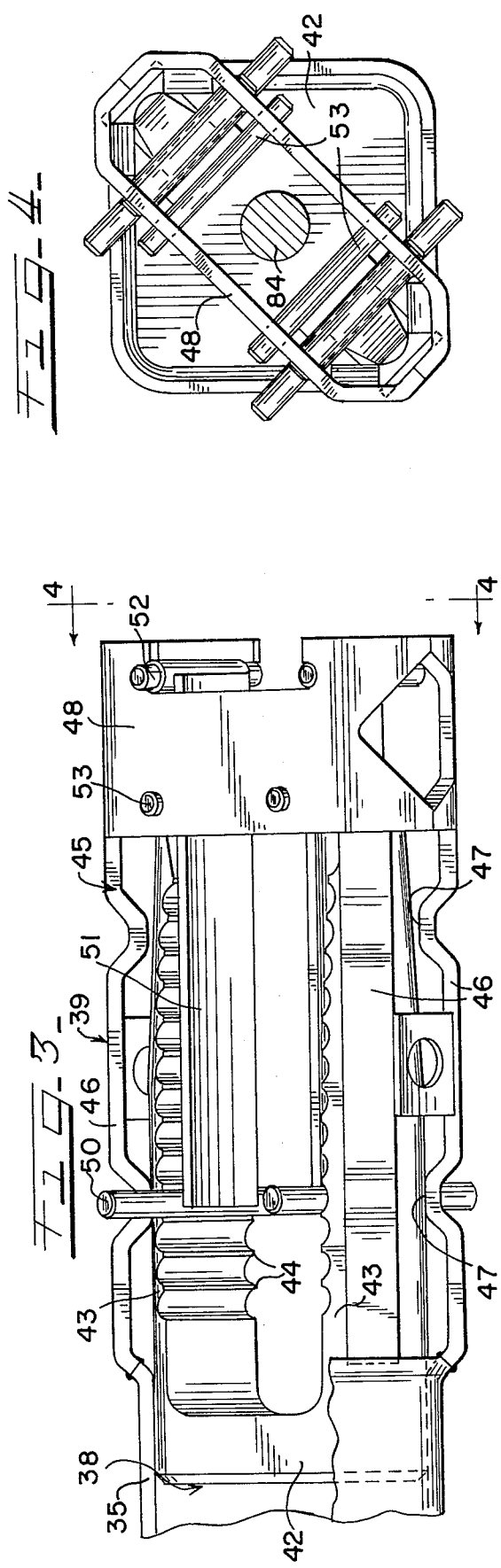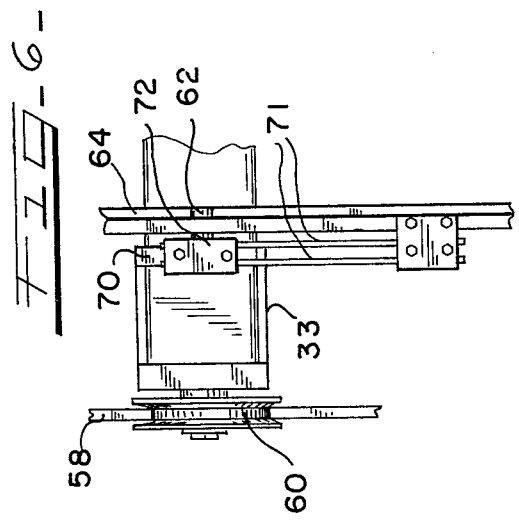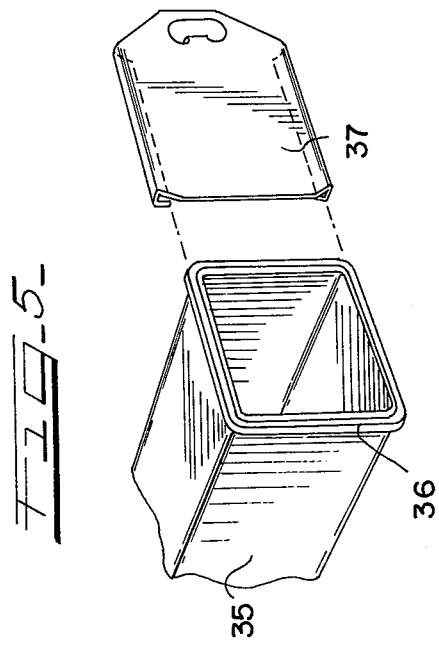

MULTIPLE-STAGE GANG-TYPE PLUG PUSHING ASSEMBLY

This invention relates in general to a continuous processing system for making a loaf food product, and more particularly to a mechanism for squeezing the food product during processing thereof to ultimately obtain a loaf product having a uniform cross-sectional dimension.

The squeeze force applying mechanism of the present invention is employed in a continuous loaf processing system where a stuffable food product is stuffed into molds which are subjected to heat for cooking the food material and to chilling for thereafter cooling the food material prior to removal of the food material from the molds. While any type of moldable food product may be made with the continuous loaf processing system, a loaf meat product may be efficiently and economically processed with the system. Accordingly, reference hereafter will essentially be to the handling of a stuffable meat material, such as sausage batter or chunk meat, to produce a loaf meat product.

The continuous loaf processing system involves the use of a plurality of magazines of loaf molds which are first coated with a suitable release agent and then stuffed with a meat material. The stuffed molds in magazines of molds are subjected to heat for a predetermined time to cook the meat material within the molds. During cooking, expansion of the meat material is compensated for by a movably positionable plug within the mold at one end thereof. The other end of the mold is closed by a removable cover. Following the cooking operation, the magazines are moved through a chilling station to chill the meat material prior to removal of the meat material from the molds. During chilling, contraction or shrinkage of the meat material is experienced, and since it is desired to ultimately provide a loaf meat product having a uniform cross-sectional dimension so that meat sliced from the mold will be uniform, the present invention provides a mechanism in the chilling station for squeezing the meat within the molds.

Heretofore, squeezing of a meat material within a mold has sometimes been accomplished by sringloaded covers. Such covers vary the force applied to the product.

The mechanism for applying a squeezing force to the product according to the present invention applies a controllable force that can be varied for different products and which improves the overall quality of the loaf meat product. Fluid motors, pneumatic or hydraulic, drive reciprocal bars which engage the movably positionable plugs in the molds. A predetermined force is applied to the rods which move the plugs into the loaf molds until the resisting force of the squeezed meat material balances the force exerted by the fluid motors. Thereafter, the rods are retracted to a rest position, and the plugs hold the meat material as squeezed.

It is therefore an object of the present invention to provide a mechanism for applying a squeezing force to a meat product in a mold where the force is controllable and may be varied for different products.

Another object of the present invention is in the provision of a gang-type plug pushing assembly for applying a controllable force to plugs in loaf molds to squeeze the product for obtaining a uniform cross-sectional dimension which improves the quality of the product.

A still further object of the present invention is in the provision of mechanism for squeezing a meat material in a mold to eliminate any air pockets which may have resulted during processing.

Other objects, features and advantages of the invention will be apparent from the following detailed disclosure, taken in conjunction with the accompanying sheets of drawings, wherein like reference numerals refer to like parts, in which:

FIG. 1 is a side elevational view of a continuous loaf processing apparatus which utilizes the product squeeze mechanism according to the present invention;

FIG. 2 is a cross-sectional view taken substantially along line 2—2 of FIG. 1 and showing the product squeeze mechanism according to the invention;

FIG. 3 is a greatly enlarged elevational view of the end of a mold where the movably positionable plug is located;

FIG. 4 is an elevational view of the end of the mold with the plug taken along lines 4—4 of FIGS. 2 and 3;

FIG. 5 is a perspective exploded view of the end of a mold having the removable cover; and FIG. 6 is a top plan view taken substantially along line 6—6 of FIG. 2 showing the anti-sway bar mechanism.

Referring now to the drawings, and particularly to FIG. 1, an overall view of the continuous loaf processing apparatus in which the product squeeze mechanism of the present invention is utilized includes a stuffer 10 at a stuffing station which loads molds in a magazine with a stuffable meat material. Thereafter, the magazine of molds is transferred by the transfer means 11 to the cooking station 12, where the molds are subjected to heat for a predetermined period of time to cook the meat material within the molds. Following the cooking operation, the magazines are transferred one at a time by means of a lowerer 13 at the discharge end of the cooking station to the inlet end of a chilling station 14. At three different positions within the chilling station 14, mechanisms 15, 16 and 17 are provided according to the invention for applying a squeezing force to the meat material within the molds. Thereafter, the product is knocked out of the molds at the knockout station 18. The magazines of molds are further processed prior to a subsequent stuffing operation at a wash station 19 and a release agent application station 20.

During cooking, the meat material expands, and during chilling, the meat material contracts or shrinks. Moreover, air pockets may develop in the meat material during stuffing and/or cooking, and these pockets permit rendering. Shrinkage of the meat material during chilling causes spacing between the mold sides and the loaf meat, resulting in "mottling", which is objectionable. In order to overcome the irregularities in loaf dimension, the mechanism for applying a squeezing force according to the present invention eliminates any possible air and/or fat pockets and compensates for shrinkage to ultimately provide a uniform cross-sectionally dimensioned loaf meat product without surface "mottling". Thereafter, slicing of the loaves will provide uniformly dimensioned slices without voids or fat pockets and an overall high quality product.

While heat may be applied to the molds at the cooking station in any suitable manner, it will be appreciated here that the cooking station includes a cooking chamber 24 having a plurality of hot water spray nozzles 25 overhead which distribute hot water onto the molds as they are incrementally moved through the cooking chamber. Similarly, the chilling station 14 includes a chilling chamber 28 having overhead cold water spray nozzles 29 for distributing cold water onto the molds to obtain a chilling action.

A magazine assembly of molds, to which the meat squeezing force is applied by the squeezing mechanism according to the invention, is generally shown in FIG. 2 and indicated by the numeral 32. The magazine includes a pair of vertically extending and horizontally spaced stringers or forks 33, 34 being interconnected by and having interconnected therewith a plurality of tubular loaf molds 35. The molds here illustrated are rectangular in cross-section and provided at one end with a peripheral flange 36 for receiving a slip-on cover 37 to close that end. At the other end of each mold, a plastic plug 38 positionably movable within the mold closes the end. A ratchet take-up mechanism 39 controls the position of plug 38. It should be appreciated here that neither the magazine assembly nor the ratchet plug and take-up mechanism form any part of the present invention, and these subject matters will be disclosed and claimed in separate applications also owned by the assignee of this application.

The plug 38 includes a generally square in cross section portion 42 conforming generally to the interior dimensions of the mold 35 and a pair of ratchet fingers 43, each having a plurality of ratchet teeth 44. While the plug portion 42 is guidably movable within the mold 35, the fingers 43 are guidably movable within a cage 45 defined by four guide bars 46. Each guide bar includes a pair of spaced guide surfaces 47, against which the plug fingers 43 ride. The inner ends of the guide bars are suitably connected, such as by welding, directly to the mold 35, while the outer ends are connected to a somewhat rectangularly shaped end support 48. Detents 50 coact with the ratchet teeth 44 and are spring-biased into engagement with the ratchet teeth by leaf springs 51. Each detent 50 is attached to one end of a leaf spring 51, while the other end of the leaf spring is secured to a pin 52 received by slots in the end support 48. Stop pins 53 are mounted in the end support 48 against which the leaf springs 51 bear. It will be appreciated here, with respect to the mechanism of the present invention for applying a squeezing force, any other suitable type of movably positionable plug and associated mechanism may be employed.

The magazine 32 is supported for movement along parallel opposed stationary rails or tracks 58 and 59 by means of wheels of rollers 60 and 61 respectively that are mounted on the upper ends of the forks 33 and 34 respectively. Also mounted at the upper ends of the forks 33 and 34 are indexing pins or dogs 62 and 63 which are engaged by a suitable index drive mechanism to index the magazines along the rails 58 and 59. The indexing drive mechanism here shown includes slotted vertically movable rails 64 and 65 and slotted horizontally and vertically movable drive rails 66 and 67. The locking rails 64 and 65, together with the movable rails 66 and 67, define a "walking beam" conveyor that is the subject of a separate application owned by the assignee of this application.

While the forks 33 and 34 are defined by a pair of spaced apart vertical plates, one on each side of the molds, a top horizontally extending cross plate 70 is provided to coact with a magazine anti-sway mechanism in the form of a pair of spring bars 71, FIG. 6, extending from the locking bar 64 and provided at its end with a pad 72 which engages the upper surface of the cross plate 70 when the locking bar is in the down position engaging the pin 62 and locking the magazine in position. The pad 72 applies a resilient braking force to each of the forks of the magazine to prevent or stop swaying of the magazine about the axes of the supporting wheels and essentially hold the magazine so that the molds are aligned along a vertical axis.

While three squeezing mechanisms 15, 16, and 17 are utilized in the chilling station, it may be appreciated any number can be utilized, and further, that all of the mechanisms are the same. One of the mechanisms is shown in FIG. 2 and will be described for purposes of explaining the present invention. As above mentioned, a force is applied to the plugs 38 for obtaining a squeeze on the meat material within the molds. Inasmuch as a force is being applied axially of the molds, it is counteracted at the squeeze station by means of upper and lower dead stops 75 and 76 which are stationary and which align with stop bars 77 and 78 mounted on the fork 34. Accordingly, the stops prevent shifting of the magazine or displacing of the magazine from the support rails 58 and 59 during the application of the squeezing forces.

In order to apply the squeezing forces, a plurality of fluid motors 82, one each aligned with each of the molds 35 of the magazine assembly, are mounted to an upstanding support member 83 lateral of the position at the squeeze station. The fluid motors may be pneumatically or hydraulically actuated and are shown in the form of cylinders having piston rods 84 actuable toward the molds and away from the molds following the application of the squeezing force. It may be appreciated other types of prime movers may be used instead of fluid motors. The rods 84 are supported by the cylinders 82 and by bores in a guide bar 85. Each of the rods 84 aligns with the center axis of a mold when a magazine of molds is positioned at the squeeze station. The rods in their rest position, as shown in FIG. 2, clear the ratchet take-up mechanism 39 so as to not impede movement of a magazine of molds and out of the squeeze station.

The piston rods 84 extend through the cylinders 82 and in the return or rest position engage limit switches 86 sensing the return of the rods to signal the controller for the system that the rods are retracted and the magazine may thereafter be incrementally indexed to its next position out of the squeeze station. The limit switches are supported by support members 87 extending from the cylinders 82. A control shown in block form at 88 coordinates the operation of the fluid motors 82. When a magazine assembly of loaf molds has been properly positioned at a squeeze station and at a proper time in the system cycle, air pressure to the cylinders 82 of a predetermined amount applies a predetermined force to the rods 84 which engage the plugs 42 and move the plugs into the molds until the resisting force of the squeezed meat product balances the force exerted by the cylinders. The spring-loaded detents 50, which engage the ratchet teeth 44 on the plugs, prevent the plugs from backing out when the cylinder rods are retracted. Following a time cycle, pressure in the cylinders 82 is reversed and the rods are withdrawn from the loaf molds. When the limit switches 86 sense the return of the rods, the overall controller of the system will be signaled and at the proper time in the system cycle, the magazine will be advanced to its next position. All of the cylinders 82 are operated at the same time to drive the rods against the plastic plugs in the molds and to retract the rods to their home position. The force applied by the cylinders may be varied according to the product being processed.

Accordingly, a controllable force for squeezing the meat product is obtained by the present invention, which improves the overall quality of the ultimate product and assures a uniform cross-sectionally dimensioned loaf meat product.

It will be understood that modifications and variations may be effected without departing from the scope of the novel concepts of the present invention, but it is understood that this application is to be limited only by the scope of the appended claims.

The invention is hereby claimed as follows:

1. In a system for continuously making a loaf food product including a magazine of loaf molds adapted to be filled with a stuffable food material, said magazine of molds including a plurality of interconnected vertically aligned and horizontally extending tubular molds, wheels connected to the molds for movably supporting the magazine on rails for movement thereof along a path transverse the longitudinal axis of the molds, each mold having a plug at one end movably positionable within the mold and a removable cover over the other end, means for applying heat to the molds in a cooking station for cooking the food material, and means for applying a chilling action to the molds in a chilling station for chilling the food material following cooking thereof, a mechanism for simultaneously applying within the chilling station a predetermined force to the plugs of each mold at a plug take-up station to squeeze the food material in the molds against the mold sides and cover to obtain uniform cross-sectionally dimensioned loaves, said mechanism comprising a plurality of reciprocal driving rods engagable with mold plugs of the molds, means for driving the rods to move the rods toward the molds, and control means causing the driving means to apply to a predetermined force to the rods and thereby cause the plugs to squeeze the food material in the molds.

2. The force applying mechanism of claim 1, wherein the control means further causes the rods to retract following the squeezing of the food material.

3. The force applying mechanism of claim 2, wherein means is provided to prevent swaying of the magazine at the plug take-up station.

4. The force applying mechanism of claim 3, wherein stop means is provided at the plug take-up station to counteract the forces applied to the magazine by the force applying mechanism 5. The force applying mechanism of claim 2, wherein sensing means is provided coacting with the control means for sensing the return of the driving rods.

6. The force applying mechanism of claim 5, wherein said sensing means includes limit switches actuable by the driving rods.

7. The force applying mechanism of claim 1, wherein said driving means includes fluid motors which are pneumatically powered.

8. The force applying mechanism of claim 1, wherein said driving means includes fluid motors which are hydraulically powered. of mechanisms are provided in the chilling station.

9. The force applying mechanism of claim 1, wherein a plurality of mechanisms are provided in the chilling station.

10. In a system for continuously making a loaf food product including a generally horizontally extending tubular loaf mold adapted to be filled with a stuffable food material, means for movably supporting the mold for movement thereof along a path transverse the longitudinal axis of the mold, said mold having a plug at one end movably positionable therein and a removable cover over the other end, means for applying heat to the mold in a cooking station for cooking the food material, and means for applying a chilling action to the mold in a chilling station for chilling the food material following cooking thereof, a mechanism for applying within the chilling chamber a predetermined force to the plug at a plug take-up station to squeeze the food material in the mold against the mold sides and cover to obtain a uniform cross-sectionally dimensioned loaf, said mechanism comprising a motor having a reciprocal driving rod engagable with the mold plug upon driving of the motor to move the rod toward the mold, and control means causing the motor to apply a predetermined force to the rod and thereby cause the plug to squeeze the food material in the mold.

* * * * *

UNITED STATES PATENT AND TRADEMARK OFFICE
CERTIFICATE OF CORRECTION

PATENT NO. : 3,948,158
DATED : April 6, 1976
INVENTOR(S) : Alvin Borsuk and Charles H. Johnson It is certified that error appears in the above-identified patent and that said Letters Patent are hereby corrected as shown below:

Abstract, lines 6 and 7, change "produce" to --product--;

Col. 6, lines 19 and 20, delete "of mechanisms are provided in the chilling station."

Signed and Sealed this

Fifth Day of October 1976

[SEAL]

Attest:

RUTH C. MASON
Attesting Officer

C. MARSHALL DANN
Commissioner of Patents and Trademarks